Jan. 30, 1968  R. J. DODGE  3,366,867
STATIC SWITCH FOR CONTROLLING DC TO AC INVERTER
Filed Oct. 23, 1964
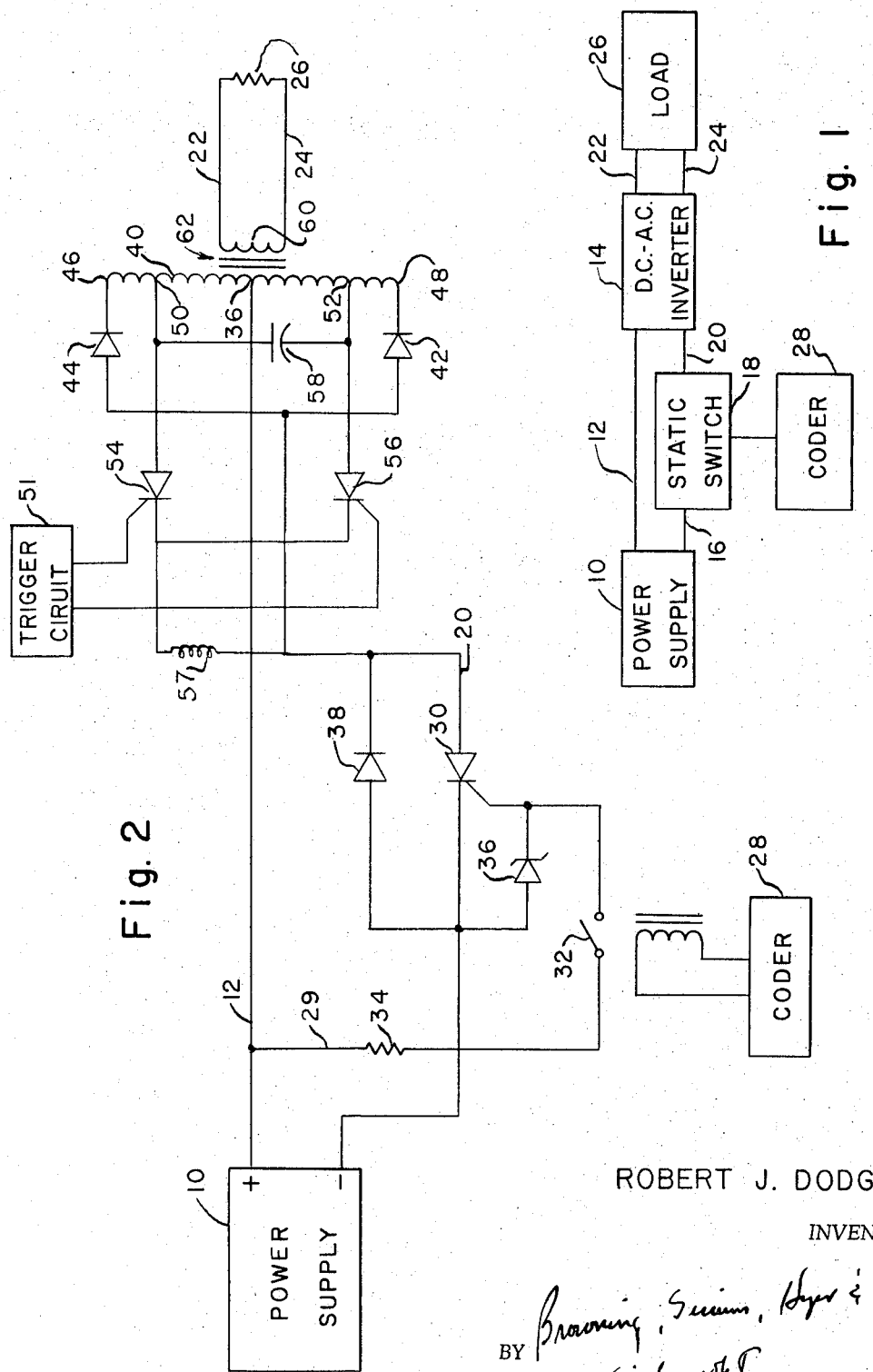
ROBERT J. DODGE
INVENTOR
BY
ATTORNEY United States Patent Office 3,366,867
Patented Jan. 30, 1968

3,366,867
STATIC SWITCH FOR CONTROLLING DC TO AC INVERTER
Robert J. Dodge, Houston, Tex., assignor to Buoys, Inc., Houston, Tex.
Filed Oct. 23, 1964, Ser. No. 405,939
19 Claims. (Cl. 321—45)

ABSTRACT OF THE DISCLOSURE

A static switch for controlling the application of power to a DC to AC inverter including a silicon controlled rectifier (SCR) normally in a high impedance state and having its anode and cathode connected as power electrode between a source of direct current voltage and a DC to AC inverter. The SCR gate is connected through a relay switch to a positive gate signal source. The relay is switched closed by an encoder causing the SCR to switch to a low impedance state to allow current to flow from the DC source to the inverter. The gate signal remains as long as the relay is closed. The inverter includes an inductor having a primary winding through which direct current is cyclically switched and a secondary winding connected to a load. Energy stored in the inductor is returned to the SCR through an oppositely poled diode connected across the power electrodes each time said cyclically switching occurs. When the relay is opened so that the gate signal is removed from the gate, the returned energy causes the SCR to switch to its high impedance state to stop the conduction of current between the source and the inverter.

The present invention relates to apparatus for switching power and, more particularly, to apparatus for controlling the application of DC power to an intermittent inductive load such as a DC to AC inverter.

Certain applications exist in which it is desirable to control the application of direct current power to an intermittent inductive load such as a DC to AC inverter. For example, DC to AC inverters are often used for supplying power to sound and light producing devices which are operated intermittently. Typical of such devices are lights and horns positioned along waterways. These devices are frequently located at remote locations in which the only source of power available is direct current battery. Intermittent operation of the load device is often achieved by interrupting the supply of DC voltage to the DC to AC inverter, in order that a minimal amount of power will be expended. Relays can be utilized for this purpose. However, a static switch provides many advantages over the relay in such operations. Thus, a static switch is generally considered to be much more reliable and to require less mainteance than relay switching apparatus in that there is no relay bounce or no relay contacts to burn. Also of considerable value is the fact the static switch can normally be of smaller size than the necessary relay and is capable of much faster operation.

The present invention provides a static switch especially adapted for controlling the application of direct current power to a DC to AC inverter. In accordance with the present invention, a switching device, suitably a silicon controlled rectifier, having two power terminals and a gate electrode is connected in one of the lines for applying direct current power to the inverter. As is known in the art, such a device normally exhibits a high impedance to the flow of current in at least one direction but is switched to a quasi stable low impedance state responsive to the application of an appropriate control signal to the gate electrode. Once the device switches to the quasi stable low impedance state, it will remain in the low impedance state until the current flowing through the device falls below a minimum level, known as the holding current. Means including a condition responsive element for continuously applying a control signal to the gate electrode whenever the condition responsive element is in one condition is also provided.

The condition responsive element may suitably be a relay, photocell, or one of several types of solid state devices which are capable of being switched from a high to a low impedance state. Thus, as long as the condition responsive element is in the one or low impedance condition, a control signal for exciting the switching device to the low impedance state will continuously be impressed across the gate electrode. When the condition responsive element is not in the one or low impedance condition, a control signal will not be applied to the device. However, once the switching device has been excited to the low impedance state, it will remain in this state so long as load current continues to flow.

In accordance with the present invention, the DC to AC inverter includes means for returning the energy stored in the magnetic field of the inductor included in the inverter to the source of DC supply voltage each time the magnetic field collapses. The energy stored in the magnetic field is utilized to reverse the flow of current through the switching device and cause the device to return to the high impedance state.

Many objects and advantages of the invention will become apparent to those skilled in the art as the following detailed description of the same unfolds when taken in conjunction with the appended drawing in which:

FIGURE 1 is a block diagram illustrating a signalling system utilizing the principles of the present invention; and FIGURE 2 is a schematic diagram illustrating the preferred embodiment of a static switch in accordance with the present invention.

Turning now to FIGURE 1 of the drawing, an illustrative system utilizing the principles of the present invention comprises a DC power supply 10 having its positive terminal connected by line 12 to a DC to AC inverter 14. The negative terminal of the power supply 10 is connected through line 16 to a static switch 18. The other side of the static switch 18 is connected through a line 20 to the DC to AC inverter 14. The output of the DC to AC inverter 14 is connected through lines 22 and 24 to a load 26, which is suitably a light or horn. A coder 28 controls the operation of the static switch 18 to produce intermittent operation of the load in accordance with a preselected pattern.

Thus, in accordance with one specific example of the invention, the DC to AC inverter provides a square wave output having a frequency of 150 cycles per second. The load utilized is a horn which doubles its frequency, the audible output of the horn being 300 cycles per second. The audible output of the horn will be produced at all times when the static switch is "closed" but will not be produced when the static switch is "open." The coder 28 suitably controls the static switch 18 to produce blast of the horn in accordance with a predetermined pattern for warning purposes.

Turning now to FIGURE 2 of the drawings for a detailed description of one preferred embodiment of the invention, the static switch 18 connected between the lines 16 and 20 can be seen to comprise a silicon controlled rectifier (SCR) 30 whose cathode is connected to the line 16 and whose anode is connected to the line 20. The gate electrode of the silicon controlled rectifier 30 is connected through a condition responsive element 32 and a resistor 34 to the line 29. Thus, when the condition responsive element 32 is in the low impedance or closed state, positive bias voltage will continuously be applied to the gate electrode of SCR 30. A zener diode 36 is connected between the gate electrode and the cathode of the SCR 30. The zener diode 36 is a desirable but not essential element, as it limits the amount of positive bias voltage applied to the gate electrode to a safe value. A conventional diode rectifier 38 is connected in shunt with the SCR 30 but poled oppositely.

The DC to AC inverted utilized in combination with the switch in practicing the present invention can be of several different types which utilize an inductor and in which the reactive energy stored in the inductor is returned to the power supply. Thus, in accordance with one preferred embodiment of the invention, the DC to AC inverter 14 comprises an inductor 40. Two series connected, oppositely poled diodes 42 and 44 are connected to the end terminals 46 and 48 of the inductor 40. The line 20 is connected to the juncture between the diodes 42 and 44. The center tap 36 of the inductor 40 is connected to line 12.

Two additional taps 50 and 52 are also provided. The taps 50 and 52 are the primary power inputs to the inductor 40, the taps 50 and 52 being connected to line 20 via choke 57 by SCR devices 54 and 56 respectively. A commutating capacitor 58 is connected across the taps 50 and 52.

The inductor 40 comprises the primary winding of transformer 62 having a secondary winding 60. The core of the transformer 62 is preferably one having what is referred to as a hysteresis curve. The end terminals of the secondary winding 60 are connected by lines 22 and 24, as mentioned previously with regard to FIGURE 1, to the load 26.

When the condition responsive element 32 is closed, positive gate voltage will be continuously applied to the SCR 30, causing the SCR 30 to switch from its normally high impedance state to a quasi stable low impedance state. As long as the SCR 30 is in its low impedance state, DC power will be continuously applied to the inverter 14 by lines 12 and 20. It will be noted that once the SCR 30 switches to its low impedance state, it will remain in the low impedance state so long as the current flowing through its power electrodes remains above a minimum level known as the holding current.

The inverter 14 includes a trigger circuit 51 for alternately applying control signals to the gates of the SCR's 54 and 56. Thus, assuming that a control signal is applied to the SCR 54, the SCR 54 will switch to the low impedance state, permitting current to flow through the SCR 54 and a portion of the transformer lying between the tap 36 and tap 50. A control signal is then applied to the SCR 56, causing it to switch from the normally high impedance state to the low impedance state. When the SCR 56 switches to the low impedance state, the commutating capacitor 58 is effectively connected in shunt with the device 54 and the charge on the capacitor 58 back biases the SCR 54, causing it to assume the high impedance state.

The reactive energy stored in the magnetic field of the transformer as a result of the flow of current through the SCR 54 is returned to the power supply 10 through the diode 42, line 12, diode 38 and line 16. The current flow produced as the inductive energy of the load is returned to the power supply will momentarily cause the device 30 to turn off. However, since a control signal is continuously applied to the gate electrode of the SCR 30, will immediately return to the low impedance state when the energy stored in the inductive load is dissipated to a level that current can again flow from the power supply 10 to the inverter 14.

The next trigger signal is again applied to the gate electrode of SCR 54, causing SCR 54 to switch to the low impedance state. When the SCR 54 switches to the low impedance state, the commutating capacitor 58 will be connected in shunt with the device 56, back biasing the device 56 and causing it to return to the high impedance state. The reactive energy stored in the magnetic field of the transformer 62 as a result of the flow of current through the SCR 56 while in the low impedance state is again applied back to the power supply through the line 20, diode 38 and line 16, but utilizing the diode 44 rather than diode 42.

From the above, it will be seen that each time one of the SCR's 54 or 56 is turned on and the other is turned off, the direction of current flow in inductor 40 of the transformer 62 will reverse. Each change in direction of the flow of current through the winding 40 will cause a voltage to be induced in the secondary winding 60. The signal produced across the winding 60 as a result of alternating the trigger signals applied to the gates of the SCR's 54 and 56 will be an alternating square wave voltage as indicated.

As mentioned above, the inductive energy stored in the magnetic field of the transformer 62 is applied back to the power supply 10 through the diodes 42 and 44 and line 20 and the switch 18 and line 16 each time the direction of current flow in the inductor changes. The stored energy is of a polarity to back bias the SCR 30, and would normally cause the device 30 to return to its high impedance state. However, since positive gate voltage is applied to the SCR 30 continually through the line 28 and resistor 34 so long as the condition responsive element 32 is closed, the SCR will remain in the on or low impedance condition at substantially all times.

However, if the condition responsive element 32 should be placed in a high impedance condition wherein positive gate voltage is not applied to the SCR 30, the inductive energy stored in the magnetic field of transformer 62 will be effective to back bias the SCR 30 and cause it to return to the high impedance state.

The diode 38 connected in shunt with the SCR 30 limits the peak inverse voltage applied to the SCR 30 and also provides a return path for the energy back to the power supply 10 subsequent to the device 30 returning to its high impedance condition. The diode rectifier 38 performs another important function in that it limits the amount of reverse current flowing through the SCR 30 when positive gate voltage is applied to the SCR 30.

Thus, it is seen that as long as the condition responsive element 32, in this particular embodiment a relay operated switch, is in one condition, a positive gate bias voltage will be continuously applied to the SCR 30 and the static switch of the present invention will permit DC supply voltage to be continuously applied to the DC to AC inverter 14. However, when the condition responsive element 32 is placed in the other condition, the positive gate bias voltage will be removed from the SCR 30. Thereafter, the next time the trigger signal is applied to one of the SCR's 54 or 56 comprising the inverter 14, the energy stored in the magnetic field of the inverter 14 will be effective to back bias the SCR 30, causing it to return to its normal high impedance state.

It is therefore possible to control the application of power to the load 26 in accordance with a desired pattern by controlling the condition of the condition responsive element 32. If, for example, a photosensitive element is utilized as the condition responsive element 32, it is possible to provide a static switch which does not utilize any moving parts. Noreover, since the amount of current flowing in the gate circuit of the SCR 30 is extremely small, it is practical to use a relay without the disadvantages resulting when a relay is utilized to conduct the relatively large current flowing through the SCR 30. Thus, the disadvantage of utilizing a mechanical switch for controlling the application of DC power to the inverter is obviated.

It will be observed that power is applied to the inverter only when it is desired that the load be operated. Maximum utilization of the energy from the power supply 10 is therefore obtained. The importance of this particular feature of the invention can only be fully appreciated when it is realized that in many instances installations of this type are located at remote locations. Thus, if batteries are utilized as the power supply 10, the effective life of the battery before it will become necessary to recharge or replace same is considerably greater than would be true if the load were controlled by a switch positioned between the inverter 14 and the load 26. Further, as mentioned previously, installations of this type are most often utilized as safety or warning devices. Thus, the improved reliability of operation attained by elimination of moving contacts with the attendant chatter and burning of contacts is eliminated, greatly increasing the reliability of the system and reducing the maintenance thereof.

Many changes and modifications will become obvious to those skilled in the art in view of the foregoing description of a preferred embodiment of the invention. The foregoing description is therefore intended to be illustrative and is not to be construed to limit the scope of the invention defined in the appended claims.

What I claim is:

1. In combination,
    (a) a DC to AC inverter including:
        (1) an inductor,
        (2) means for cyclically switching direct current through said inductor, and
        (3) means for returning the energy stored in the magnetic field of said inductor to a source of direct current supply voltage each time the magnetic field collapses; and
    (b) a solid state static switch comprising:
        (1) a switching device having two power terminals and a gate electrode, said device normally exhibiting a high impedance to the flow of current in at least one direction but being switched to a quasi stable low impedance state responsive to the application of a control signal to said gate electrode and thereafter remaining in said low impedance state until the current flowing through said device in said at least one direction falls below a minimum level,
        (2) means for connecting the power terminals of said device in series circuit with a power line for supplying direct current supply voltage to said inverter with said device blocking the flow of current to said inverter when in said high impedance state, and
        (3) means including a condition responsive element effective when said condition responsive element is in one condition for continuously applying said control signal to the gate electrode of said device to switch said device to the low impedance state, said device being switched to the high impedance state responsive to said condition responsive element being in another state as the energy stored in the magnetic field of said inductor is returned to the source of the direct current supply voltage each time the magnetic field collapses.

2. The combination defined in claim 1 wherein said switching device is a silicon controlled rectifier.

3. A static switch as defined in claim 1 wherein said switching device is connected to the negative terminal of said source and wherein said control means is connected between the positive terminal of said source and said gate electrode.

4. A static switch as defined in claim 1 further including an oppositely poled diode rectifier connected in shunt with said switching device.

5. A signalling system comprising:
    (a) a source of direct current supply voltage having a positive terminal and a negative terminal;
    (b) an inverter circuit including:
        (1) an inductor having a center tap and two power inputs disposed on opposite sides of said center tap,
        (2) first and second switching devices,
        (3) means connecting each of said power inputs to a respective one of said switching devices with said switching devices controlling the flow of current through said power inputs,
        (4) means connecting to each of said switching devices for operating said switching devices to alternately cause current to flow to said power inputs whereby the direction of current flow in said inductor is alternating,
        (5) means connected to each of said power inputs for returning to said source the energy stored in the magnetic field of said inductor each time the direction of current flow reverses,
        (6) a second inductor magnetically coupled to said first inductor whereby the alternating current flow in said first inductor induces an alternating voltage across said second inductor;
    (c) signalling means connected to said second inductor and effective to produce a signal responsive to the alternating voltage being induced across said second inductor;
    (d) a static switch connected in circuit with said source and said inverter for controlling the operation of said signalling means, said static switch including:
        (1) a switching device having two power electrodes and a gate electrode, said device normally exhibiting a high impedance between said power terminals but being switched to exhibit a low impedance to the flow of current in one direction when a control signal is applied to said gate electrode and remaining in said low impedance state so long as the current flowing in the one direction is in excess of a minimum holding current,
        (2) control means including a condition responsive element connected for continuously applying a control signal to said gate electrode responsive to said condition responsive element being in one condition; and
    (e) coding means effective to control the condition of said condition responsive element.

6. A signalling system as defined in claim 5 wherein said power electrodes are connected in series with the negative electrode of said source and said control means is connected to the positive electrode of said source.

7. A signalling means as defined in claim 5 further including oppositely poled diode rectifier means connected in shunt with said switching device.

8. In combination a DC to AC inverter and static switch;
    (a) said inverter including:
        (1) an inductor having a center tap,
        (2) means for connecting said center tap to one side of a source of direct current supply voltage,
        (3) means including two switching devices for connecting the other side of said source of direct current supply voltage to two terminals of said inductor disposed on opposite sides of said center tap,
        (4) means for operating said switching devices to cause the direction of current flow through said inductor to alternate,
        (5) and means for returning to the source the energy stored in the magnetic field of said inductor each time the direction of current flow in said inductor reverses;
    (b) said static switch comprising:
        (1) switching means having first and second electrodes, said switching means normally being substantially non-conductive between said first and said second electrodes and adapted to be rendered conductive in at least one direction by a control signal and remaining conductive so long as the current flowing through said first and second electrodes in said at least one direction remains above a minimum level, (2) means connecting said switching means in series with the source and said inverter by means and second electrodes, and (3) control means including a condition responsive element for continuously applying a control signal to said switching means when said condition responsive element is in one condition, the energy stored in said magnetic field when returned to said source being effective to return said switching means to the non-conductive state responsive to said condition responsive element being in another condition.

9. A combination as defined in claim 8 wherein said switching means is a silicon controlled rectifier having a gate electrode.

10. A combination as defined in claim 8 wherein said switching means is a silicon controlled rectifier having a gate electrode adapted for connection by one of its first and second electrodes to the negative terminal of a source of direct current supply voltage and wherein said control means is adapted to be connected between said gate electrode and the positive terminal of the source of direct current supply voltage.

11. A combination as defined in claim 8 further including asymmetrically conductive means exhibiting a high impedance to the flow of current in said at least one direction and a low impedance to the flow of current in the other direction connected in shunt with said switching means.

12. A combination as defined in claim 11 wherein said asymmetrically conductive means is a diode rectifier.

13. A combination as defined in claim 11 further including means connected between the gate electrode and the cathode of said silicon controlled rectifier for limiting the potential therebetween.

14. A combination as defined in claim 11 further including a zener diode connected between the cathode and the gate electrode of said silicon controlled rectifier for limiting the potential therebetween.

15. Apparatus as defined in claim 8 wherein said condition responsive element is a relay having a pair of contacts connected in circuit with said control means.

16. A static switch adapted to control the application of power from a source of direct current supply voltage to an inverter connected to operate a load, wherein the inverter includes an inductor for storing energy from said source and means for periodically reversing the flow of current through said inductor to cause the magnetic field of said inductor to collapse, said switch comprising, in combination:

(a) a switching device having first and second power electrodes and a gate electrode, said switching device normally exhibiting a high impedance to the flow of current through said power electrodes in at least one direction but being switched to a quasi-stable state in which the device exhibits a low impedance to the flow of current in said one direction responsive to a control signal being applied to said gate electrode and remaining in said low impedance state so long as the current flowing through said power electrodes in said one direction remains above a minimum level;

(b) means for connecting said device in series between one side of such source of direct current supply voltage and such inverter to control the flow of current therebetween in said one direction;

(c) means for returning stored energy from such inductor to such source and said device when such magnetic field collapses to cause the current flowing through said power electrodes in said one direction to fall below said minimum level, and (d) means including a condition responsive element effective when said condition responsive element is in one condition for continuously applying said control signal to the gate electrode of said device sufficient to switch said device to the low impedance state, and to substantially remain in said state upon interruption of such load when said control signal is so applied, but said device being switched to the high impedance state responsive to said condition responsive element being in another state and the energy stored in the magnetic field of said inductor being returned to the source of the direct current supply voltage when such magnetic field collapses.

17. A static switch as defined in claim 16 wherein said switching device is a silicon-controlled rectifier.

18. A static switch as defined in claim 16 wherein said switching device is connected to the negative terminal of such source and wherein said control means is connected between the positive terminal of such source and said gate electrode.

19. A static switch as defined in claim 16 wherein returning means includes an oppositely-poled diode rectifier connected in shunt with said switching device.

References Cited

UNITED STATES PATENTS

| | | | |
|---|---|---|---|
| 3,183,429 | 5/1965 | Baycura et al. | 307—88.5 |
| 3,246,227 | 4/1966 | Strohmeier et al. | 321—45 X |
| 3,259,834 | 7/1966 | Wright | 307—88.5 |
| 3,278,823 | 10/1966 | Ross | 307—88.5 |
| 3,278,827 | 10/1966 | Corey et al. | 307—88.5 |
| 3,286,155 | 11/1966 | Corey | 307—88.5 |
| 3,303,407 | 2/1967 | Depenbrock et al. | 321—45 |

ORIS L. RADER, *Primary Examiner.*

T. B. JOIKE, *Assistant Examiner.*

UNITED STATES PATENT OFFICE
CERTIFICATE OF CORRECTION

Patent No. 3,366,867                                  January 30, 1968

Robert J. Dodge

It is hereby certified that error appears in the above numbered patent requiring correction and that the said Letters Patent should read as corrected below.

In the heading to the printed specification, lines 4 and 5, for "assignor to Buoys, Inc., Houston, Tex." read -- assignor to Automatic Power, Inc., a corporation of Delaware --

Signed and sealed this 29th day of April 1969.

(SEAL)
Attest:

Edward M. Fletcher, Jr.                            EDWARD J. BRENNER

Attesting Officer                                      Commissioner of Patents